United States Patent Office 3,438,927
Patented Apr. 15, 1969

3,438,927
INVISIBLE INK
Joseph R. Ehrlich, New York, N.Y., assignor to
Meredith Publishing Company
No Drawing. Filed Apr. 28, 1967, Ser. No. 634,466
Int. Cl. C08f 33/04; C09d 11/10; B41m 5/22
U.S. Cl. 260—33.4                     6 Claims

ABSTRACT OF THE DISCLOSURE

An invisible ink, comprising (1) a low weight percentage of polyvinyl pyrolidone resin, (2) a colorless reagent capable of giving a colored reaction product with another reagent and (3) butyl or amyl alcohol which is liquid at room temperature. An appropriate reagent is used to react with the colorless reagent thereby producing a visible image on the printed surface.

Cross references to related applications

Skinner, Ser. No. 512,842, filed Dec. 10, 1965, now Patent No. 3,363,336, Skinner and Ostashever, Ser. No. 512,882, filed Dec. 10, 1965, now Patent No. 3,363,337, and Skinner and Ehrlich, Ser. No. 512,883, filed Dec. 10, 1965, now Patent No. 3,363,338, disclose in their specifications an alcohol base invisible ink containing polyvinyl pyrolidone resin and a colorless reagent. These applications, however, do not express or have any appreciation of the highly critical composition required in such an invisible ink when it is to be used with a modified offset printing press in an automated printing operation. Investigation subsequent to the above identified applications has shown that in such a printing operation the components and the relative amounts of the components are highly critical factors, the type of alcohol and the amount of polyvinyl pyrolidone resin being especially critical. The ink disclosed in the present application was developed especially for use in the modified offset printing operation described in the application of Niblock, Ser. No. 646,616, filed June 16, 1967.

Background of the invention

This invention relates to invisible printing inks and, more particularly, to an invisible printing ink which can be utilized in a modified offset printing press.

Background of the invention—description of the prior art

All invisible inks work on the same basic principle. The ink is scribed upon the writing surface in the desired manner, then some color activating means is employed to react with the ink so that the invisible scribing becomes visible. For example, vinegar (ink) can be scribed on paper (writing surface) and made visible by holding the paper over a candle (heat is the color activating means). More sophisticated invisible inks are available; however, production line use of invisible ink with a modified offset printing press process like that disclosed by Niblock in a copending application, Ser. No. 646,616, has introduced many problems not solved by previously known invisible inks.

For example, some invisible inks have the disadvantage of requiring a time interval before the color activating means reacts with the ink to give a visible image. In a teaching method employing invisible ink, the reaction time between the invisible ink and the color activating means must be almost immediate so that the student will know whether he has answered correctly. Other invisible inks are disadvantageous since they can be detected due to change in the composition or reflectivity of the material to which they are applied, so the "invisible" image is actually visible. Still other invisible inks discolor with aging or when exposed to air or excessive light and thus gradually become visible. In a student's workbook having portions printed in invisible ink, the book becomes useless if the invisible ink forms an image after printing but before being color activated.

A further disadvantage of many invisible inks occurs when a normal, visible ink is scribed or printed over the area of paper also imprinted with the invisible ink. The visible ink sometimes reacts with the invisible ink in the same way as a color activating means, either immediately or over a period of time, and causes the invisible ink areas to become visible. Therefore, during a commercial printing operation or during use of an invisible ink printed product, the resulting interaction of the visible and invisible inks may destroy the utility of the product.

It is an important object of this invention to provide an invisible printing ink which substantially avoids the disadvantages of prior art invisible printing inks.

It is also an object of this invention to provide an improved invisible ink which will react almost instantaneously with a color activating means to provide a sharp contrasting image on the paper.

Another object is to provide an improved invisible ink which does not migrate laterally or downwardly through the fibers of the paper and which will react only with a chosen color activating means in the desired printed areas.

A further object is to provide an improved invisible ink which does not react with visible printing inks, which cannot be detected on the paper as a gloss or change in the structure of the paper, and which does not discolor with age.

Yet a further object is to provide an improved invisible ink which can be successfully employed in high-speed commercial printing presses of the modified offset kind disclosed in the copending Niblock application referred to above.

One further object of the present invention is to provide a substantially nontoxic invisible ink which may be safely used as a teaching aid.

Further objects, features, and advantages will be more easily understood by the more detailed description hereinafter set forth.

Summary of the invention and description of preferred embodiment

The objectives of this invention can be achieved by compounding a low viscosity ink containing a colorless reagent capable of giving a colored reaction or reaction product with another reagent, polyvinyl pyrolidone resin (PVP) to bond and prevent migration of the reagent on the paper and a butyl or amyl alcohol solvent. The proportions of the colorless reagent and the resin are carefully controlled. The alcohol acts as the vehicle for the PVP and the colorless reagent which are dissolved therein. The color activating means is a separate compound, usually in fluid form. It is applied to the surface printed with the invisible ink and reacts to cause the invisible printing to become visible.

Most commercial printing inks are oil based. They dry by absorption into the paper and by oxidation of the ink. Since the present invention is an alcohol base ink, it dries primarily by evaporation. Alcohols which provide the proper evaporation rate include 1-pentanol, n-butyl alcohol and isobutyl alcohol. The use of one of these appropriate alcohols is critical since other alcohols may evaporate too rapidly or too slowly.

For example, alcohols of lower carbon content are more volatile and consequently tend to evaporate too readily leaving non-uniform depositions of PVP and colorless reagent on the paper. Also, although a solution of PVP in alcohol acts as a lubricant, premature evaporation of the alcohol results in the collection of a tacky residue of PVP and colorless reagent on printing press rollers before the ink can be successfully transferred to a printed surface. The tacky residue ultimately causes the rollers to stick together, tear, and finally shred.

As another example of the criticality of the alcohol, alcohols of a higher carbon content are not highly volatile and thus evaporate very slowly. Consequently, the ink may be successfully transferred to a printing surface, but the ink may not dry properly. The result is "print back" or transfer of the wet printed image onto the back surface of the subsequent sheet of printed material.

Although 1-pentanol, n-butyl or isobutyl alcohol will provide the desired results, isobutyl alcohol has been found to provide optimum characteristics.

As previously discussed, after the ink is printed onto the paper, the alcohol vehicle evaporates leaving the PVP and the colorless reagent as an invisible image. The PVP is a thickening agent which increases the viscosity of the ink. It assures proper bonding and penetration of the ink into the micelles of the paper fibers. The PVP, however, prevents the ink from spreading or forming a fuzzy image. The PVP also prevents the invisible ink from penetrating entirely through the printed paper. It localizes the penetration into the micelles in the region of the printed surface.

Further, the PVP reduces the penetration of the color activating means into the invisibly inked paper. This, in turn, forces the color activation reaction to occur on the surface of the paper where the results are more visible and more immediate. The PVP also tends to abrogate the difference in light reflection on an invisibly inked paper surface. It should be noted that a resin-coated paper is preferable since it prevents undue invisible ink penetration and migration into the paper. Finally, the PVP prevents mechanical abrasion of the otherwise powdery ink substrate.

The amount of PVP in the invisible ink is an important feature of the invention. If there is to much PVP, the color activating means which is later applied cannot dissolve the PVP quickly enough to expose the colorless reagent and thereby produce the necessary nearly instantaneous reaction with the reagent. Furthermore, too much PVP makes it difficult to use the ink with a high-speed press. When the ink is on the rollers of the press, the friction and air movement will evaporate the alcohol solvent leaving the undesired sticky residue of PVP and colorless reagent which ultimately shreds the roller. One other disadvantage of using too much PVP is that the printed area will show up on the paper as a gloss and thus be distinguishable just as if a visible printing ink were used.

At the opposite extreme, too little PVP will result in improper thickening of the invisible reagent. Consequently, the reagent penetrates too deeply into the fibers of the paper. Insufficient reagent near the printed surface of the paper results in slow and difficult to see visible results when chemical activation is sought with the color activating means. A PVP having substantially the following specifications is highly satisfactory: Moisture—5% maximum, active ingredient—95% minimum, K value—26-35, ash 0.02% maximum, unsaturation (calculated as percent vinyl pyrrolidine)-1.0% maximum. The weight percentages of PVP utilized in the invisible inks described herein refer to weight percentage of PVP having the above specification. Invisible ink solutions containing PVP in a range of about 0.8 to 2.0 percent by weight are preferably employed, and, in fact, PVP in an amount greater than 2 percent is very unsatisfactory. The best results have been obtained in the range of about 1.2 to 1.6 weight percent of PVP with 1.3 percent by weight PVP being optimum.

The colorless or invisible reagent capable of giving a colored reaction product with another reagent must react almost instantaneously with color activating means. The reagent and activator must also be substantially nontoxic and safe for use as intended. Among those colorless reagents successfully tested and their corresponding color activating means useful in the compositions of the invention are the following:

Reagent—
    1—propyl gallate
    2—dimethyl glyoxim
    3—potassium succinate
    4—sodium nitrite Color activating means—
    1—iron octoate
    2—nickel chloride
    3—copper chloride
    4—phenylene diamine hydrochloride or α-napthyl amine hydrochloride The maximum percentage of colorless reagent is critical since too much reagent produces the appearance of color on the paper after a short aging time. On the other hand, an insufficient amount of reagent results in improperly developed contrast on the areas of the paper printed in invisible ink and subsequently reacted with color activating means. It has been found that the concentration of the reagent is preferably less than 5 percent by weight. At least about 0.5 percent by weight of the reagent is necessary, however, to achieve desirable visible results.

Preferably the ink composition contains about 1.75% by weight of propyl gallate. Propyl gallate is substantially nontoxic and provides almost immediate reaction with iron octoate to form a dark grey or black area. Sodium nitrite also provides an exceptionally fast reacting ink; whereas, potassium succinate is relatively slow, requiring about 5 seconds after activation begins to become visible.

The iron octoate color activating means is about a 4% by weight solution of iron octoate in mineral spirits. Another satisfactory activator solution contains about 1.75% by weight iron octoate in mineral spirits. Normally the activator will be contained in a felt tip pen. By diluting the iron octoate solution in the pen with alcohol but maintaining the concentration of iron octoate, the activator can be made more reactive. In practice, the activator comprises about 4% iron octoate, 35% ethanol and 66% mineral spirits or about 1.75% iron octoate, 30% mineral spirits and the remainder ethanol. All percentages are by weight. About a 6% by weight solution of a hydrous ferric chloride or about a 4.4% by weight solution of a hydrous ferric ammonium sulfate in propyl alcohol and water is also highly satisfactory as a propyl gallate ink activator.

The visible reaction product has a number of advantageous characteristics. First the product is insoluble in water. This prevents the possibility of water damage or smudging. Second, the reaction occurs quickly. This accentuates the utility of the invisible ink as a teaching aid. Third, the reaction is clean. It immediately anchors to the fibers of the paper, preventing "draw over" or streaking of the visible reactant product over the paper. Fourth, the reaction product does not collect on the felt tip pen or brush which contains the activator. The reaction product remains on the paper.

An ultraviolet absorber, such as 2,4-dihydroxy-benzophenone may be added to the ink in small percentages. The absorber prevents discoloration due to prolonged exposure to light.

The ingredients from the invisible ink composition are mixed under normal conditions of temperature and humidity, e.g., 70° F., 30 to 40% relative humidity, by dissolving the PVP and colorless reagent in the appropriate alcohol. The ink is used under similar conditions. The mixture is vigorously agitated during combination of and until the components are completely dissolved. Care is exercised when handling the alcohol since it is volatile and flammable.

The alcohol solvent invisible inks also tend to leach out standard commercial inks from the press rollers. It is therefore necessary to use new rollers and equipment, completely free of residual inks and dyes, when using the invisible ink.

PVP, well known as an excellent detoxifier for a number of materials, is safe and easy to handle. Propyl gallate is harmless in small quantities, but is harmful in concentrated form and should therefore be handled cautiously. An invisible ink using propyl gallate as the colorless reagent reacts with iron. Therefore, iron or iron containing press rollers and plates are not to be used with such an ink. Effective substitutes for the iron parts include parts made from or coated with plastics, aluminum, cadmium, and zinc.

The following is one specific example of the invention: Mix together in solution 95.20 percent by weight isobutyl alcohol which acts as the solvent for the ink, 1.30 percent by weight polyvinyl pyrolidone resin (PVP), 1.75 percent by weight, 2,4-dihydroxy-benzophenone and 1.75 percent by weight propyl gallate which is an invisible or colorless reagent which reacts to form a dark gray or black area when an iron octoate color activator fluid is brought in contact with the colorless reagent.

Another example comprises: In solution 95.50 percent by weight isobutyl alcohol, 1.00 percent by weight polyvinyl pyrolidone resin (PVP), 1.75 percent by weight 2,4-dihydroxy-benzophenone and 1.75 percent by weight propyl gallate.

These compositions have been used to print several texts and workbooks which are being used as teaching mechanisms.

While in the foregoing there has been provided a detailed description of various materials and concentrations useful in various embodiments of the invention, it is to be understood that all embodiments obvious to those skilled in the art are to be included within the scope of the invention as claimed.

What is claimed is:
1. An improved invisible ink composition consisting essentially of about 0.5 to 5.0 percent by weight of a colorless reagent capable of giving colored reactions with another reagent and about 0.8 to 2.0 percent by weight of polyvinyl pyrolidone resin dissolved in 1-pentanol, n-butyl alcohol, or isobutyl alcohol.
2. The composition as set forth in claim 1 wherein said ink is about 1.2 to 1.6 percent by weight polyvinyl pyrolidone resin.
3. The composition as set forth in claim 1 wherein said ink is about 1.3 percent by weight polyvinyl pyrolidone resin.
4. The composition as set forth in claim 1 wherein said colorless reagent is about 0.5 to 2 percent by weight propyl gallate.
5. The composition as set forth in claim 1 including an ultraviolet absorber.
6. The composition as set forth in claim 1 wherein said ink is about 1.30 percent by weight polyvinyl pyrolidone resin, and about 1.75 percent by weight propyl gallate dissolved in isobutyl alcohol.

References Cited
UNITED STATES PATENTS

| | | | |
|---|---|---|---|
| 3,363,336 | 1/1968 | Skinner et al. | 117—36.8 X |
| 3,363,337 | 1/1968 | Skinner et al. | 117—36.8 X |
| 3,363,338 | 1/1968 | Skinner et al. | 117—36.8 X |

MORRIS LIEBMAN, *Primary Examier.*

L. T. JACOBS, *Assistant Examiner.*

U.S. Cl. X.R.

117—36.8